United States Patent
Dadasaheb et al.

(10) Patent No.: US 8,968,697 B2
(45) Date of Patent: Mar. 3, 2015

(54) HYDROGEN PRODUCTION METHOD BY MULTI-STEP COPPER-CHLORINE THERMOCHEMICAL CYCLE

(75) Inventors: Yadav Ganapati Dadasaheb, Mumbai (IN); Parhad Prakash Santoshrao, Mumbai (IN); Nirukhe Ashwini Bhagavan, Mumbai (IN); Parvatalu Damaraju, New Delhi (IN); Bhardwaj Anil, New Delhi (IN); Prabhu Bantwal Narayana, New Delhi (IN); Thomas Nuzhath Joeman, New Delhi (IN); Kale Dilip Madhusudan, New Delhi (IN)

(73) Assignees: Institute of Chemical Technology, East Mumbai (IN); ONGC Energy Centre Trust Oil and Natural Gas Corporation Limited (ONGC), New Delhi (IN)

(*) Notice: Subject to any disclaimer, the term of this patent is extended or adjusted under 35 U.S.C. 154(b) by 0 days.

(21) Appl. No.: 14/131,285

(22) PCT Filed: Jul. 9, 2012

(86) PCT No.: PCT/IN2012/000483
§ 371 (c)(1),
(2), (4) Date: Apr. 18, 2014

(87) PCT Pub. No.: WO2013/054340
PCT Pub. Date: Apr. 18, 2013

(65) Prior Publication Data
US 2014/0348742 A1   Nov. 27, 2014

(30) Foreign Application Priority Data
Jul. 8, 2011   (IN) .......................... 1973/MUM/2011

(51) Int. Cl.
C01B 3/24   (2006.01)
C01B 3/06   (2006.01)

(52) U.S. Cl.
CPC ......... C01B 3/068 (2013.01); *C01B 2203/0272* (2013.01); *C01B 2203/82* (2013.01); *C01B 2203/143* (2013.01)
USPC ............ 423/657; 423/481; 423/500; 423/579

(58) Field of Classification Search
USPC .................................................. 423/650–657
See application file for complete search history.

(56) References Cited

U.S. PATENT DOCUMENTS

2010/0129287 A1* 5/2010 Gabriel et al. ................ 423/657

*Primary Examiner* — Melvin C Mayes
*Assistant Examiner* — Kenneth Vaden
(74) *Attorney, Agent, or Firm* — Fish & Richardson P.C.

(57) ABSTRACT

The present invention discloses a method for thermochemical production of hydrogen and oxygen from water by a low temperature, multi-step, closed, cyclic copper-chlorine (Cu—Cl) process involving the reactions of copper and chlorine compounds. A method for production of hydrogen via Cu—Cl thermochemical cycle consists of four thermal reactions and one electrochemical reaction and one unit operation. The cycle involves six steps: (1) hydrogen production step; (2) copper production step; (3) drying step; (4) hydrogen chloride production step; (5) decomposition step; (6) oxygen production step. The net reaction of the sequential process is the decomposition of water into hydrogen and oxygen. The methods for production of copper oxide which comprises contacting copper chloride particles with superheated steam and production of oxygen comprises reaction of copper oxide with dry chlorine as a part of hydrogen production by thermochemical Copper-Chlorine (Cu—Cl) cycle. The reactions are performed in a flow through type quartz reactor as fixed bed type at high temperature and atmospheric pressure.

22 Claims, 3 Drawing Sheets

HYDROGEN PRODUCTION METHOD BY MULTI-STEP COPPER-CHLORINE THERMOCHEMICAL CYCLE

CROSS REFERENCE TO RELATED APPLICATIONS

This application is a U.S. National Phase Application under 35 U.S.C. §371 of International Patent Application No. PCT/IN2012/000483 filed Jul. 9, 2012, which claims the benefit of Indian Patent Application Serial No. 1973/MUM/2011 filed Jul. 8, 2011, both of which are incorporated herein by reference in their entirety.

FIELD OF THE INVENTION

The present invention deals with the production of hydrogen using a six step thermochemical copper-chlorine (Cu—Cl) cycle as one variant. Water is split into hydrogen and oxygen through chemical reactions at high temperatures through copper and chlorine compounds to form a closed loop cycle. The present invention also relates to a system, including experimental set up for the production of copper oxide and oxygen production by chlorination of copper oxide as a part of thermochemical Cu—Cl cycle wherein copper chloride is reacted with superheated steam to produce cooper oxide and chlorination of formed copper oxide further produces oxygen. The reactions are carried out in fixed bed reactor at high temperature and atmospheric pressure.

BACKGROUND OF THE INVENTION

Today, the need for alternative energy sources is a central concern because of traditional resource depletion and global climate change due to emission of greenhouse gases. Hydrogen is an apparent alternative to hydrocarbon fuels. It has been proposed as a means to reduce greenhouse gases and other harmful emissions, satisfying the need of efficient, sustainable, non-polluting source of energy. It is an ideal energy carrier that helps to increase our energy diversity and security by reducing our dependence on hydrocarbon-based fuels.

Hydrogen is produced from a very diverse base of primary energy feedstocks and a variety of process technologies including steam reforming, partial oxidation, coal gasification, biomass pyrolysis/gasification, electrolysis, photosynthetic/photobiological, photocatalytic water splitting and thermochemical water splitting.

Hydrogen production from water splitting is environmentally benign and attractive as a clean source of energy. Thermochemical process for hydrogen production utilizing water as a raw material and nuclear energy as primary energy source is an attractive option which involves the separation of water into hydrogen and oxygen through chemical reactions at high temperatures to create a closed loop where water can be fed to the process; and all other reactants are regenerated and recycled.

More than hundred thermochemical cycles have been reported in the literature. A few of the most promising cycles have been studied so far based on some criteria as simplicity of the cycle, efficiency of the process and the ability to separate a pure hydrogen product. Among various feasible thermochemical cycles i.e. sulphur-iodine, cerium-chlorine, iron-chlorine, vanadium-chlorine and copper-chlorine, Cu—Cl cycle has the advantage to produce required hydrogen at a relatively low temperature (550° C.).

Cu—Cl cycle is a hybrid process which uses both heat and electricity to carry out a series of reactions i.e. chemical and electrochemical reactions where the net reaction is the splitting of water into hydrogen and oxygen. The proposed Cu—Cl cycle has two variations, which are known as a four-step process and a five-step process. There are some technical challenges associated with Cu—Cl cycle. Despite these challenges and risks, the Cu—Cl cycle offers a number of key advantages.

GB1461646 discloses a process for production of water by an endothermic cycle through intermediate copper-chlorine and magnesium compounds where intermediary products react and are regenerated.

U.S. Pat. No. 3,919,406 describes a closed loop thermochemical route for production of hydrogen by a succession of four reactions where chlorides of copper and magnesium, hydrochloric acid, and magnesium oxide break down water into its constituent elements with a net result of splitting water into hydrogen and oxygen.

US2008/0256952 discloses a solar powered thermochemical Cu—Cl hydrogen production system and a solar heating system with molten salt comprising sodium nitrate and potassium nitrate, as a heat transfer medium to provide thermal and electrical energy to the thermochemical, system.

US2010/0129287 describes a system for production of hydrogen gas from water decomposition using a thermochemical cycle comprising three, four and five steps. The present invention relates to reactors and vessels and heat coupling methods which are used in a closed loop of a copper-chlorine thermochemical cycle to produces hydrogen and oxygen by using energy from clean sources such as nuclear and solar.

US2010/0025260 discloses a new approach to use low grade heat or waste heat from nuclear or an industrial sources for hydrogen production using combined chemical or vapor compression heat pumps and a thermochemical cycle.

Barbooti et al. (Thermochimica Acta 78 (1984) 275-284) have explained the copper-chlorine thermochemical cycle involving the set of reactions such as hydrogen production, partial regeneration of copper, dechlorination of copper chloride, generation of oxygen and regeneration of hydrogen chloride.

Lewis et al. (Nuclear Production of Hydrogen, Third Information Exchange Meeting, 2003) have developed low temperature cycles designed for low temperature heat around 500 to 550° C.

Rosen et al. (Canadian Hydrogen Association Workshop, 2006) have focused on a copper-chlorine (Cu—Cl) cycle, which has been identified as a highly promising cycle for thermochemical hydrogen production driven by nuclear heat from Super-Critical Water Reactor (SCWR).

Lewis et al. (Int. J. Hydrogen Energy 34(9) (2009) 4115-4124 and 4125-4135) have carried out a detailed study of thermochemical cycles for efficiency calculations.

Orhan et al. (Int. J. Hydrogen Energy 35 (2010) 1560-1574) have studied the coupling of Cu—Cl thermochemical cycle with a desalination plant for nuclear-based hydrogen production.

Rosen et al. (Canadian Hydrogen Association Workshop, 2006) have focused on a copper-chlorine (Cu—Cl) cycle, which has been identified as a highly promising cycle for thermochemical hydrogen production driven by nuclear heat from Super-Critical Water Reactor (SCWR).

Daggupati et al. (Int. J. Hydrogen Energy 35(10) (2010) 4877-4882) have examined copper chloride solid conversion during hydrolysis to copper oxychloride in the thermochemical copper-chlorine (Cu—Cl) cycle of hydrogen production.

Serban et al. (AIChE 2004 Spring National Meeting, 2004) has adopted an approach of seeking water-splitting cycles that have maximum reaction temperatures of less than 550° C. This makes it possible to consider a number of lower temperature nuclear reactors, including supercritical water and liquid metal cooled reactors as well as high temperature CANDU reactors.

Cu—Cl cycle presents a number of prospective advantages such as maximum cycle temperature (550° C.) allow the use of a wider range of heat sources like nuclear, solar etc; intermediate chemicals are relatively safe, inexpensive and abundant. This involves minimum solid handling as compared to other processes which allows the cycle to operate efficiently. All individual steps have been investigated and experimentally proven. One of the steps could be performed at a much lower temperature by use of low grade waste heat from the nuclear or other sources. Though, ahead of these advantages can be recognized, scale-up of equipment is needed further.

OBJECTIVE OF THE INVENTION

Broad objective of the invention is to propose a hydrogen production method which will reduce greenhouse gases and other harmful emissions, satisfies the need of efficient, sustainable, non-polluting source of energy. This is an ideal energy carrier that helps to increase our energy diversity and security by reducing our dependence on hydrocarbon-based fuels.

The principal objective of this invention is to provide an improved multi-step closed loop Cu—Cl thermochemical cycle for hydrogen production as it is a promising method to generate hydrogen as a clean fuel in the future.

Another objective of present invention is to provide an improved process for synthesis of copper oxide and oxygen production by chlorination of copper oxide as a part of multi-step thermochemical Cu—Cl cycle for hydrogen production.

Another objective of present invention is to an improved multi-step closed loop Cu—Cl thermochemical cycle which can be coupled to nuclear or solar sources to provide heat.

SUMMARY OF THE INVENTION

A method for production of hydrogen via Cu—Cl thermochemical cycle consists of five thermal reactions and one electrochemical reaction. The cycle involves six steps: (1) hydrogen production; (2) copper production; (3) drying; (4) hydrogen chloride production; (5) decomposition; (6) oxygen production. An integrated process flow sheet has been developed for production of hydrogen via Cu—Cl thermochemical cycle, which involves following reactions:

| Step-1: | Hydrogen Generation Reaction | $2Cu_{(s)} + 2HCl_{(g)} \rightarrow 2CuCl_{(l)} + H_{2(g)}$ |
|---|---|---|
| Step-2: | Electrochemical Reaction | $4CuCl_{(aq)} \rightarrow 2CuCl_{2(aq)} + 2Cu_{(s)}$ |
| Step-3: | Drying | $2CuCl_{2(aq)} \rightarrow 2CuCl_{2(s)}$ |
| Step-4: | Hydrolysis Reaction | $CuCl_{2(s)} + H_2O_{(g)} \rightarrow CuO_{(s)} + 2HCl_{(g)}$ |
| Step-5: | Decomposition Reaction | $CuCl_{2(s)} \rightarrow CuCl_{(l)} + \frac{1}{2}Cl_{2(g)}$ |
| Step-6: | Oxygen Generation Reaction | $CuO_{(s)} + \frac{1}{2}Cl_{2(g)} \rightarrow CuCl_{(l)} + \frac{1}{2}O_{2(g)}$ |
| | Overall Reaction | $H_2O \rightarrow H_{2(g)} + \frac{1}{2}O_{2(g)}$ |

A chemical reaction takes place in each step, except drying step. The chemical reactions form a closed loop which recycles all of the copper-chlorine compounds on a continuous basis, without emitting any greenhouse gases to the atmosphere.

But the present invention can be deduced to four basic steps of method for the production of hydrogen by thermochemical Cu—Cl cycle like.

Step 1: contacting of copper with dry hydrogen chloride (HCl) to form cuprous chloride (CuCl) and hydrogen gas Step 2: electrolysis of CuCl of step a) to produce copper and cupric chloride ($CuCl_2$)

Step 3: hydrolysis of $CuCl_2$ of step b) to produce cupric oxide (CuO) and hydrogen chloride (HCl)

Step 4: reacting CuO with chlorine to produce CuCl and oxygen gas.

and wherein $CuCl_2$ is partially decomposed to produce CuCl and $Cl_{2(g)}$.

A non-catalytic reaction of copper chloride particles with superheated steam in a fixed bed reactor with the effect of various reaction parameters such as effect of mole ratio of steam to copper chloride, temperature of superheated steam, flow rate of nitrogen and reaction temperature and a reaction of copper oxide particles with chlorine gas by varying the parameters such as effect of mole ratio of copper oxide to chlorine, flow rate of chlorine, flow rate of nitrogen and reaction temperature to achieve maximum conversion have been studied as a part of Copper-Chlorine (Cu—C) water splitting thermochemical cycle.

BRIEF DESCRIPTION OF THE DRAWINGS

The accompanying drawings are used to illustrate the present invention.

STATEMENT OF THE INVENTION

A method for thermochemical production of hydrogen and oxygen from water by a six-step copper-chlorine (Cu—Cl) process involving the reactions of copper and chlorine compounds has been developed. This process forms a closed loop by recycling all the reactants and products on a constant basis, without emitting any greenhouse gases to the atmosphere. The process described herein uses a lower temperature than any other thermochemical process with the readily available and inexpensive intermediate compounds which pose little or no hazardous material harms.

A method for hydrogen production by thermochemical Cu—Cl cycle comprises hydrolysis reaction of copper chloride (Step-4) to copper oxide and hydrogen chloride gas and hydrogen chloride gas is consumed for hydrogen production (Step-1) and oxygen production step (Step-6), as a last step, which closes the cycle, by chlorination of copper oxide, produced in Step-4 and chlorine gas generated in Step-3, wherein the reactions are carried out in a flow through type quartz reactor as fixed bed type at high temperature and atmospheric pressure. The hydrolysis of copper chloride and oxygen generation reaction as a part of Cu—Cl thermochemical cycle for hydrogen production are experimentally demonstrated in proof-of-concept work, thus indicating chemical viability. The experimental data indicates that a less steam to copper chloride molar ratio is required for high conversion and high yields of CuO.

DESCRIPTION OF THE INVENTION

The present invention discloses the process for the production of hydrogen by thermochemical Cu—Cl cycle involving six reactions.

But the present invention can be deduced to four basic steps of method for the production of hydrogen by thermochemical Cu—Cl cycle like.

Step 1: contacting of copper with dry hydrogen chloride (HCl) to form cuprous chloride (CuCl) and hydrogen gas Step 2: electrolysis of CuCl of step a) to produce copper and cupric chloride ($CuCl_2$)

Step 3: hydrolysis of $CuCl_2$ of step b) to produce cupric oxide (CuO) and hydrogen chloride (HCl)

Step 4: reacting CuO with chlorine to produce CuCl and oxygen gas and wherein $CuCl_2$ is partially decomposed to produce CuCl and $Cl_{2(g)}$.

Figure 1:
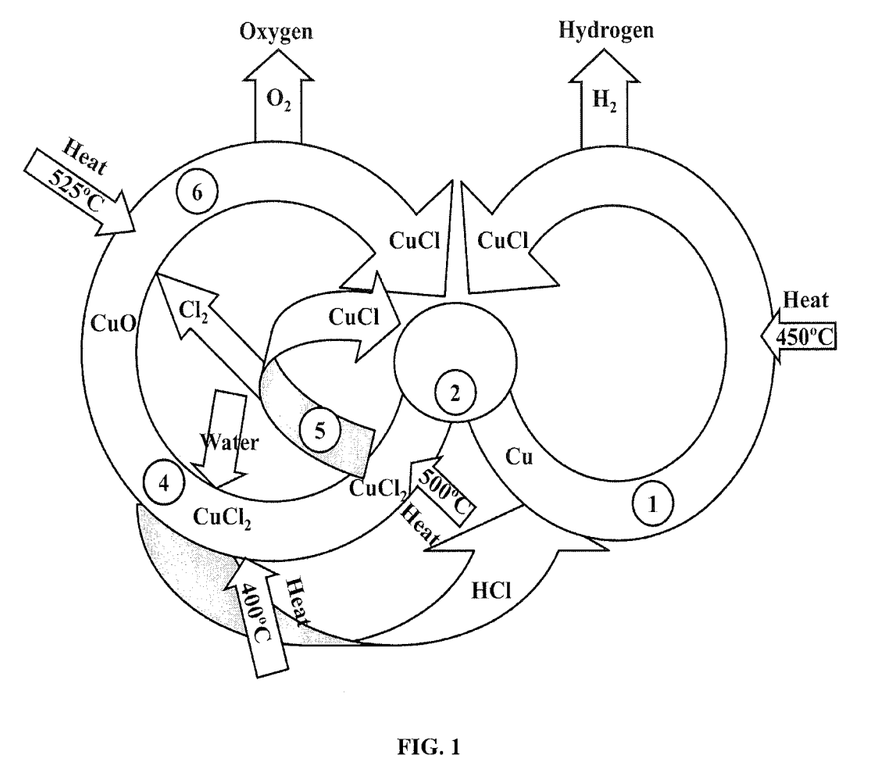
FIG. 1 is a representation of closed loop of thermochemical Cu—Cl cycle for hydrogen production.

These reactions can be transformed in the form of closed loop of thermochemical Cu—Cl cycle wherein hydrogen production is carried out as representation in FIG. 1.

The present invention discloses the process for the production of hydrogen by thermochemical Cu—Cl cycle involving six reactions. The reactions in the form of closed loop of thermochemical Cu—Cl cycle for hydrogen production are representation in FIG. 1. The block diagram has been made for the Cu—Cl cycle and shown in FIG 2.

Figure 2:
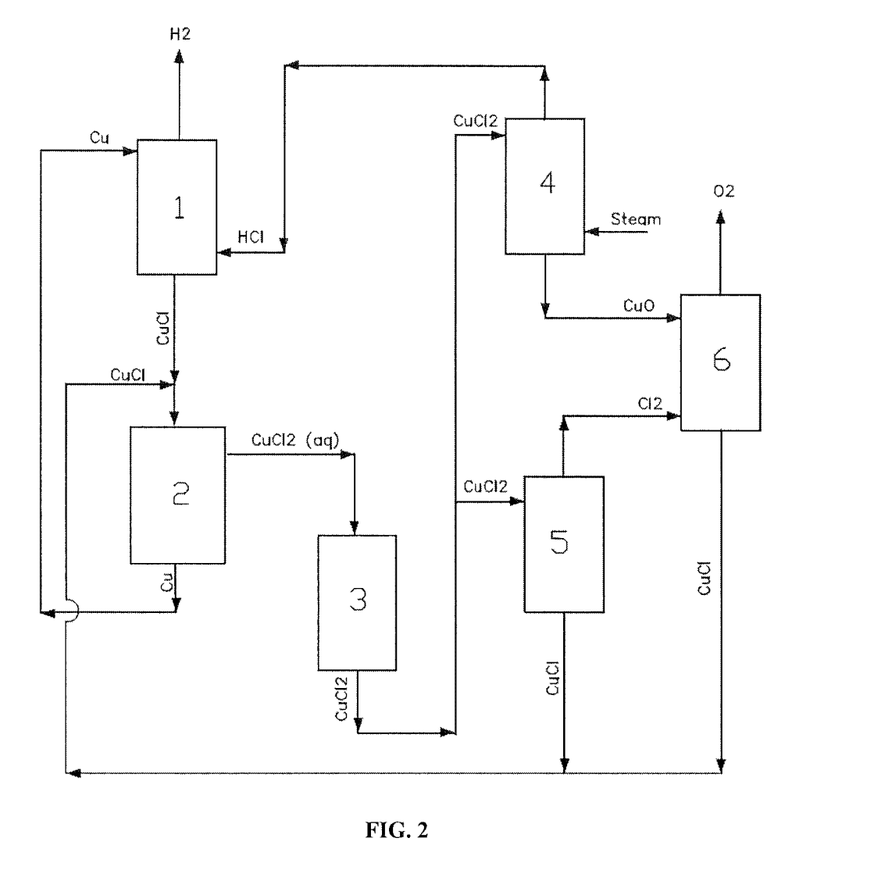
FIG. 2 is a schematic view of conceptual process layout of thermochemical Cu—Cl cycle for hydrogen production.

The key components of Cu—Cl cycle are six interconnected reactors. In the hydrogen production reactor 1, copper particles react with dry HCl gas to produce $H_{2(g)}$ and $CuCl_{(l)}$. Generated $H_{2(g)}$ is collected and stored. The produced $CuCl_{(l)}$ is supplied to electrochemical step. In the electrochemical cell 2, an aqueous solution of CuCl is electrolyzed to produce solid copper and aqueous $CuCl_2$ solution. The solid copper particles are then supplied to hydrogen production reactor 1. However, an aqueous $CuCl_2$ solution from electrochemical cell 2 is dried in dryer 3 to produce $CuCl_2$ particles. The solid $CuCl_2$ particles are collected, conveyed and then fed to decomposition and hydrolysis reaction. In hydrolysis reactor 4, $CuCl_2$ particles react with steam to produce two product streams viz. $HCl_{(g)}$ and CuO solid particles, where produced $HCl_{(g)}$ is supplied to hydrogen production reactor 1. Simultaneously, $CuCl_2$ particles are fed to decomposition reactor 5 to produce $CuCl_{(l)}$ and $Cl_{2(g)}$. CuO solid particles from hydrolysis reaction enters the oxygen production reactor 6 where it reacts with $Cl_{2(g)}$ leaving from decomposition reactor 5 to produce $CuCl_{(l)}$ and $O_{2(g)}$. Generated $O_{2(g)}$ is collected and stored. However, $CuCl_{(l)}$ streams from decomposition reactor 5 and oxygen production reactor 6 are collectively supplied to electrochemical cell 2 for electrolysis.

As described above, all the chemical reactions involved form a closed loop with recycling all of the reactants and products on a continuous basis with net reaction of water splitting resulting into hydrogen and oxygen.

The results of study of hydrolysis of copper chloride (Step-5) and chlorination of copper oxide (Step-6) are discussed below.

The present invention relates to a system, including experimental set up (FIG. 3) for the production of copper oxide copper oxide and hydrogen chloride gas by hydrolysis of copper chloride (Step-4) wherein hydrogen chloride gas generated is recycled to hydrogen production (Step-1) and copper oxide formed is used for oxygen production (Step-6) of thermochemical Cu—Cl cycle.

Figure 3:
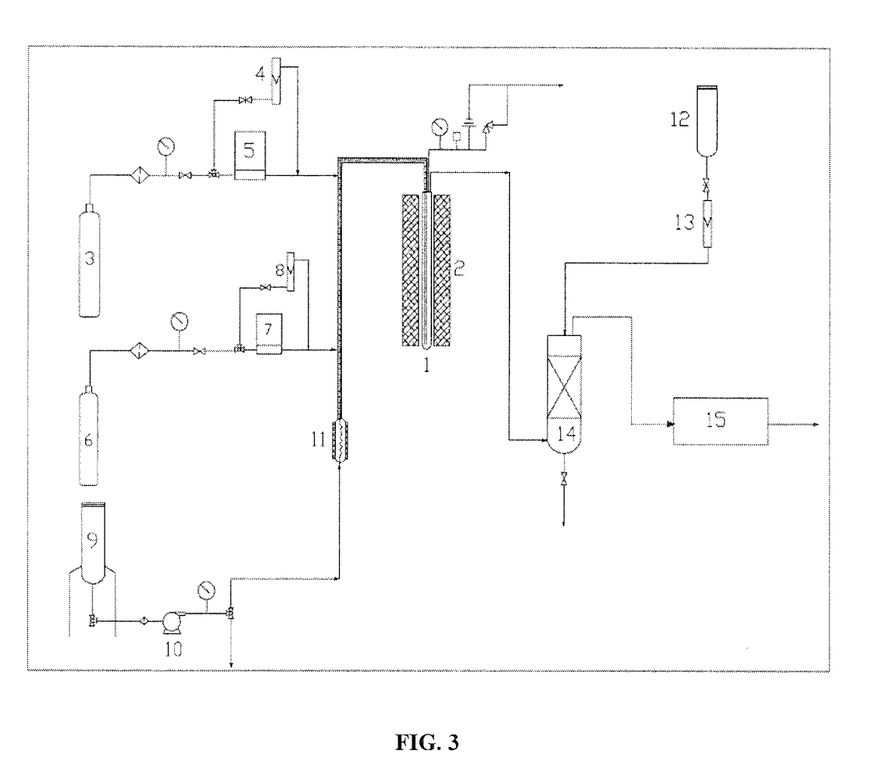
FIG. 3 is a representation of an experimental set up used to perform the experiments cited in the examples.

FIG. No. 3 is a representation of an experimental set up used to perform the experiments cited in the examples.

The experimental set up comprises:
a microreactor (1) made of quartz, with a capacity of approximately 50 $cm^3$ enclosed by furnace (2);
a cylinder (3) for nitrogen;
a rotameter (4) or mass flow controller (5) to control the flow of carrier gas;
a cylinder (6) for hydrogen chloride or chlorine;
a mass flow controller (7) or rotameter (8) to control the flow of hydrogen chloride or chlorine gas;
a water collection tank (9) to supply water to vaporizer;
a pump (10) to drive the liquid at calculated flow rate to vaporizer;
a vaporizer (11) for generation of steam;
a NaOH collection tank (12) to supply water to scrubber at a particular flow tare through rotameter (13);
a scrubber (14) to scrub generated hydrogen chloride;
a moisture trap (15) to trap any moisture.

As said above, present invention can be deduced to four basic steps of method for the production of hydrogen by thermochemical Cu—Cl cycle like.

Step 1: contacting of copper with dry hydrogen chloride (HCl) to form cuprous chloride (CuCl) and hydrogen gas Step 2: electrolysis of CuCl of step a) to produce copper and cupric chloride ($CuCl_2$)

Step 3: hydrolysis of $CuCl_2$ of step b) to produce cupric oxide (CuO) and hydrogen chloride (HCl)

Step 4: reacting CuO with chlorine to produce CuCl and oxygen gas and wherein $CuCl_2$ is partially decomposed to produce CuCl and $Cl_{2(g)}$.

Some of the embodiments of the invention can be described as follows:

One of the embodiments of present invention wherein production of hydrogen is carried out with at least one product of at least one step is used as reactant in other step. But in present method for the production of hydrogen it is found that all products of at least one step are can be recycled.

Another embodiment of the present invention is that copper and dry hydrogen chloride (HCl) can be preheated before contacting of copper with dry hydrogen chloride at temperature in the range of 300-600° C.

Another embodiment of the present invention is that electrolysis of CuCl can be carried out in aqueous condition.

Another embodiment of the present invention is that hydrolysis of $CuCl_2$ can be carried out to obtain solid CuO and dry hydrogen chloride (HCl). But it is found that hydrolysis of $CuCl_2$ can be carried out with superheated steam for effective conversion.

Another embodiment of the present invention is that reaction of CuO with chlorine is carried out to obtain molten CuCl salt and oxygen gas.

Another embodiment of the present invention is that hydrolysis of $CuCl_2$ can be carried out with superheated steam having temperature ranging from 200° C. to 600° C.

For effective hydrolysis, superheated steam having temperature in range of 300° C. to 500° C. can be used.

It is found that superheated steam has pressure ranging from 1 to 5 atm but pressure preferably in range of 1 to 3 atm can be used. Hydrolysis of $CuCl_2$ with superheated steam can also be carried out at atmospheric pressure.

Another embodiment of the present invention is that hydrolysis of $CuCl_2$ is carried out in temperature range of 100° C. to 800° C. but temperature range of 300° C. to 500° C. can be used preferably.

Another embodiment of the present invention is that hydrolysis of $CuCl_2$ with superheated steam can be carried out with mole ratio in the range 1:1 to 1:100 of steam to copper chloride. But for effective conversion preferable mole ratio in the range 1:5 to 1:30 of steam to copper chloride can be used.

Another embodiment of the present invention is that the reaction of CuO with chlorine can be carried out at a temperature in range of 300° C. to 700° C. The reaction of CuO with chlorine can also be carried out preferably in the temperature range of 450° C. to 550° C.

Another embodiment of the present invention is that the reaction of CuO with chlorine can be carried out in the mole ratio of copper oxide to chlorine ranges between 1:1 to 1:10. But this mole ratio of copper oxide to chlorine can be used preferably in ranges between 1:1 to 1:2.5. This reaction of CuO with chlorine can be carried out at atmospheric pressure.

Another embodiment of the present invention is that $CuCl_2$ produced in electrolysis step can be decomposed to produce $CuCl$ and $Cl_{2(g)}$. This decomposition of $CuCl_2$ is carried out at a temperature in range of 300° C. to 700° C. to produce molten CuCl salt and chlorine gas. It is found that decomposition is carried out preferably in the temperature in range of 400° C. to 550° C.

Another embodiment of the present invention is that $CuCl_2$ can be decomposed in range of 10 to 90 percent of total $CuCl_2$ produced in step b). But $CuCl_2$ can be partially decomposed preferably in range of 40 to 60 percent of total $CuCl_2$ produced in step b).

Another embodiment of the present invention is that $CuCl_2$ obtained in step b) can be dried or in dried form. Further $CuCl_2$ obtained in step b) can also be partially dried.

Yet another embodiment of the present invention is that CuO obtained in step c) can have particle size in range about 0.1 to 500 microns.

Yet another embodiment of the present invention is that at least one product of at least one step can be used as reactant in other step to form overall a closed loop thermochemical Cu—Cl cycle reaction through intermediate copper and chlorine compounds. Further it is found that at least one product of each of the above step is used as reactant in other step.

Step 1: Hydrogen Generation as a Part of Cu—Cl Thermochemical Cycle

According to the process of present invention, hydrogen generation reaction is performed in a flow-through type quartz microreactor as a fixed bed reactor type enclosed by furnace wherein the temperature of the furnace is controlled using a PID controller and the temperature inside the reactor is monitored by K-type thermocouple placed inside the reactor.

According to the process of present invention, dry hydrogen chloride gas required for reaction is supplied through mass flow controller to the reactor through the quartz tube extended to the bottom of the reactor.

According to the process of present invention, dry hydrogen chloride gas is diluted with inert gas such as nitrogen. Carrier gas facilitates continuous removal of generated hydrogen gas during the reaction.

According to the process of present invention, the outlet of the reactor is connected to the scrubber to scrub the unreacted hydrogen chloride gas.

According to invention, hydrogen generation reaction is carried out in quartz microreactor with mole ratio of Cu to dry hydrogen chloride gas flow rate in the range between 1:1 to 1:10.

According to invention, hydrogen generation reaction is carried out in quartz microreactor with mole ratio of dry hydrogen chloride gas to nitrogen in the range between 1:0 to 1:10.

According to invention, hydrogen generation reaction is carried out in quartz microreactor with reaction temperature in the range between 300° C. to 600° C.

According to invention, hydrogen generation reaction is carried out in quartz microreactor with particle size of copper in the range between 1 μm to 2000 μm.

Step 3: Hydrolysis of Copper Chloride as a Part of Cu—Cl Thermochemical Cycle

According to the process of present invention, hydrolysis reaction is performed in a flow-through type quartz microreactor as a fixed bed reactor type enclosed by furnace wherein the temperature of the furnace is controlled using a PID controller and the temperature inside the reactor is monitored by K-type thermocouple placed inside the reactor.

According to the process of present invention, the steam required for reaction is supplied to the reactor through the quartz tube extended to the bottom of the reactor wherein water at a calculated flow rate is pumped through the pump to the vaporizer to produce steam.

According to the process of present invention, the steam temperature is maintained at desired condition by line heaters up to reactor.

According to the process of present invention, the steam used is diluted with inert gas such as nitrogen. Carrier gas facilitates continuous removal of generated hydrogen chloride during the reaction.

According to the process of present invention, the outlet of the reactor is connected to the scrubber to scrub the hydrogen chloride generated in-situ.

The present invention will be further illustrated by the following examples, which are merely representative but are not intended to restrict the scope of the present invention in any way.

Step 4: Chlorination of Copper Oxide as a Part of Cu—Cl Thermochemical Cycle

The present invention relates to a system, including experimental set up FIG. 3 for the production of oxygen by chlorination of copper oxide (Step-6) wherein chlorine gas generated in decomposition reaction (Step-4) is utilized and cuprous chloride formed is given for electrolysis (Step-2) of thermochemical Cu—Cl cycle.

According to the process of present invention, oxygen generation reaction is performed in quartz microreactor as a fixed bed reactor type enclosed by furnace wherein the temperature of the furnace is controlled using a PID controller and the temperature inside the reactor is monitored by K-type thermocouple placed inside the reactor.

According to the process of present invention, dry chlorine gas required for reaction is supplied through mass flow controller to the reactor through the quartz tube extended to the bottom of the reactor.

According to the process of present invention, dry chlorine gas is diluted with inert gas such as nitrogen. Carrier gas facilitates continuous removal of generated oxygen gas during the reaction.

According to the process of present invention, the outlet of the reactor is connected to the scrubber to scrub the unreacted chlorine.

According to invention, chlorination reaction is carried out in quartz microreactor with chlorine flow rate in the range between 5 to 30 $cm^3$/min.

According to invention, chlorination reaction is carried out in quartz microreactor with mole ratio of CuO to chlorine flow in the range between 1:0.5 to 1:2.5.

Step 5: Decomposition of Copper Chloride as a Part of Cu—Cl Thermochemical Cycle According to the process of present invention, decomposition reaction is performed in a flow-through type quartz microreactor as a fixed bed reactor type enclosed by furnace wherein the temperature of the furnace is controlled using a PID controller and the temperature inside the reactor is monitored by K-type thermocouple placed inside the reactor.

According to the process of present invention, inert gas such as nitrogen is supplied through mass flow controller to the reactor to facilitate continuous removal of generated chlorine gas during the reaction.

According to the process of present invention, the outlet of the reactor is connected to the scrubber to scrub generated chlorine gas.

EXAMPLES

Example 1-5

According to the described disclosure of the invention following experiments are conducted in a quartz microreactor. The reaction is carried out as fixed bed reactor type. The dry hydrochloric acid gas required for reaction is supplied through mass flow controller to the reactor through quartz tube extended to the bottom of the reactor. The reaction is carried out at atmospheric pressure. The dry hydrochloric acid gas is introduced in the reactor at a desired flow rate. The results are presented in Table 1. The reactions are performed at the following operating conditions:

Cu: 0.015 moles (1 g)
Molar ratio of HCl/Cu: 5:1
Size of Cu: 3-5 μm
$N_2$ flow rate: 15 $cm^3$/min.

TABLE 1

| Example No. | Temperature (°C.) | Conversion (%) |
|---|---|---|
| 1 | 300 | 20 |
| 2 | 425 | 72 |
| 3 | 450 | 81 |
| 4 | 475 | 82 |
| 5 | 525 | 86 |

Example 6-8

According to the described disclosure of the invention following experiments are conducted in a quartz microreactor. The reaction is carried out as fixed bed reactor type. The dry hydrochloric acid gas required for reaction is supplied through mass flow controller to the reactor through quartz tube extended to the bottom of the reactor. The reaction is carried out at atmospheric pressure. The dry hydrochloric acid gas is introduced in the reactor at a desired flow rate. The results are presented in Table 2. The reactions are performed at the following operating conditions:

Cu: 0.015 moles (1 g)
Molar ratio of HCl/Cu: 1:1
Size of Cu: 3-5 μm
Temperature: 450° C.

TABLE 2

| Example No. | $N_2$ flow rate ($cm^3$/min.) | Conversion (%) |
|---|---|---|
| 6 | 0 | 90 |
| 7 | 15 | 92 |
| 8 | 30 | 95 |

Example 9-11

According to the described disclosure of the invention following experiments are conducted in a quartz microreactor. The reaction is carried out as fixed bed reactor type. The dry hydrochloric acid gas required for reaction is supplied through mass flow controller to the reactor through quartz tube extended to the bottom of the reactor. The reaction is carried out at atmospheric pressure. The dry hydrochloric acid gas is introduced in the reactor at a desired flow rate. The results are presented in Table 3. The reactions are performed at the following operating conditions:

Cu: 0.015 moles (1 g)
Size of Cu: 3-5 μm
Temperature: 450° C.
$N_2$ flow rate: 50 $cm^3$/min.

TABLE 3

| Example No. | Molar ratio of HCl/Cu | Cu Conversion (%) |
|---|---|---|
| 9 | 1:1 | 70 |
| 10 | 4:1 | 92 |
| 11 | 6:1 | 95 |

Example 12-15

According to the described disclosure of the invention following experiments are conducted in a quartz microreactor. The reaction is carried out as fixed bed reactor type. The dry hydrochloric acid gas required for reaction is supplied through mass flow controller to the reactor through quartz tube extended to the bottom of the reactor. The reaction is carried out at atmospheric pressure. The dry hydrochloric acid gas is introduced in the reactor at a desired flow rate. The results are presented in Table 3. The reactions are performed at the following operating conditions:

Cu: 0.015 moles (1 g)
Molar ratio of HCl/Cu: 4:1
Temperature 450° C.
$N_2$ flow rate: 15 $cm^3$/min.

TABLE 4

| Example No. | Size of Cu (μm) | Conversion (%) |
|---|---|---|
| 12 | 10 | 95 |
| 13 | 40 | 88 |
| 14 | 150 | 55 |
| 15 | 500 | 30 |

Example 16-21

According to the described disclosure of the invention following experiments are conducted in a quartz microreactor. The reaction is carried out as fixed bed reactor type. The steam required for reaction is supplied to the reactor through quartz tube extended to the bottom of the reactor. The reaction is carried out at atmospheric pressure. The steam is introduced in the reactor at a desired flow rate. The results are presented in Table 5. The reactions are performed at the following operating conditions:

Copper chloride: 0.00743 moles (1 g)
Reaction temperature: 500° C.
Steam temperature: 550° C.
$N_2$ flow rate: 30 $cm^3$/min.

TABLE 5

| Example No. | Steam/$CuCl_2$ Mole ratio | Conversion (%) |
|---|---|---|
| 16 | 1:2 | 50 |
| 17 | 1:5 | 72 |
| 18 | 1:15 | 85 |
| 19 | 1:20 | 90 |
| 20 | 1:30 | 93 |
| 21 | 1:50 | 97 |

Example 22-26

According to the described disclosure of the invention following experiments are conducted in a flow through type quartz microreactor. The reaction is carried out as fixed bed reactor type. The steam required for reaction is supplied to the reactor through quartz tube extended to the bottom of the reactor. The reaction is carried out at atmospheric pressure. The steam is introduced in the reactor at a constant flow rate. The results are presented in Table 6. The reactions are performed at the following operating conditions:

Copper chloride: 0.00743 moles (1 g)
Steam/$CuCl_2$ mole ratio: 1:15
Reaction temperature: 500° C.
$N_2$ flow rate: 10 $cm^3$/min.

TABLE 6

| Example No. | Steam Temperature (° C.) | Conversion (%) |
|---|---|---|
| 22 | 250 | 90.5 |
| 23 | 300 | 90.6 |
| 24 | 350 | 91.9 |
| 25 | 400 | 91.9 |
| 26 | 500 | 92 |

Example 27-29

According to the described disclosure of the invention following experiments are conducted in a flow through type quartz microreactor. The reaction is carried out as fixed bed reactor type. The steam required for reaction is supplied to the reactor through quartz tube extended to the bottom of the reactor. The reaction is carried out at atmospheric pressure. The steam is introduced in the reactor at a constant flow rate. The results are presented in Table 7. The reactions are performed at the following operating conditions:

Copper chloride: 0.00743 moles (1 g)
Steam/$CuCl_2$ mole ratio: 1:20
Steam temperature: 400° C.
$N_2$ flow rate: 10 $cm^3$/min.

TABLE 7

| Example No. | Reaction Temperature (° C.) | Conversion (%) |
|---|---|---|
| 27 | 300 | 35.8 |
| 28 | 400 | 85.6 |
| 29 | 500 | 95 |

Example 30-33

According to the described disclosure of the invention following experiments are conducted in a quartz microreactor. The reaction is carried out as fixed bed reactor type. The dry chlorine gas required for reaction is supplied through mass flow controller to the reactor through quartz tube extended to the bottom of the reactor. The reaction is carried out at atmospheric pressure. The dry chlorine gas is introduced in the reactor at a desired flow rate. The results are presented in Table 8. The reactions are performed at the following operating conditions:

Copper oxide: 0.01 moles (0.795 g)
CuO/$Cl_2$ mole ratio: 1:5
Reaction temperature: 525° C.
$N_2$ flow rate: 15 $cm^3$/min.

TABLE 8

| Example No. | $Cl_2$ Flow rate ($cm^3$/min) | Conversion (%) |
|---|---|---|
| 30 | 5 | 66 |
| 31 | 10 | 74 |
| 32 | 15 | 84 |
| 33 | 20 | 80 |

Example 34-37

According to the described disclosure of the invention following experiments are conducted in a quartz microreactor. The reaction is carried out as fixed bed reactor type. The dry chlorine gas required for reaction is supplied through mass flow controller to the reactor through quartz tube extended to the bottom of the reactor. The reaction is carried out at atmospheric pressure. The dry chlorine gas is introduced in the reactor at a constant flow rate. The results are presented in Table 9. The reactions are performed at the following operating conditions:

Copper oxide: 0.01 moles (0.795 g)
Reaction temperature: 550° C.
$N_2$ flowrate: 15 $cm^3$/min.

TABLE 9

| Example No. | CuO:$Cl_2$ Mole Ratio | Conversion (%) |
|---|---|---|
| 34 | 1:1 | 54 |
| 35 | 1:2 | 65 |
| 36 | 1:4 | 84 |
| 37 | 1:6 | 90 |

Example 38-40

According to the described disclosure of the invention following experiments are conducted in a quartz microreactor. The reaction is carried out as fixed bed reactor type. The dry chlorine gas required for reaction is supplied through mass flow controller to the reactor through quartz tube extended to the bottom of the reactor. The reaction is carried out at atmospheric pressure. The dry chlorine gas is introduced in the reactor at a constant flow rate. The results are presented in Table 10. The reactions are performed in the following operating conditions:

Copper oxide: 0.01 moles (0.795 g)
$N_2$ flow rate: 15 cm$^3$/min.

TABLE 10

| Example No. | Reaction Temperature (° C.) | Conversion (%) |
|---|---|---|
| 38 | 400 | 15 |
| 39 | 500 | 75 |
| 40 | 550 | 84 |

Example 41-43

According to the described disclosure of the invention following experiments are conducted in a quartz microreactor. The reaction is carried out as fixed bed reactor type. The results are presented in Table 11. The reactions are performed at the following operating conditions:

Copper chloride: 0.01 mol (1.345 g)
$N_2$ flow rate: 15 cm$^3$/min.

TABLE 11

| Example No. | Reaction Temperature (° C.) | Conversion (%) |
|---|---|---|
| 41 | 400 | 5 |
| 42 | 450 | 30 |
| 43 | 550 | 85 |

The invention claimed is:

1. A method for the production of hydrogen by thermochemical Cu—Cl cycle, the method comprising the steps of:
   a) contacting copper with dry hydrogen chloride (HCl) to form cuprous chloride (CuCl) and hydrogen gas;
   b) electrolysis of the CuCl of step a) to produce copper and cupric chloride ($CuCl_2$);
   c) hydrolysis of a portion of the $CuCl_2$ of step b) to produce cupric oxide (CuO) and hydrogen chloride (HCl); and
   d) reacting the CuO with chlorine to produce CuCl and oxygen gas,
   wherein a second portion of the $CuCl_2$ is decomposed to produce CuCl and $Cl_{2(g)}$.

2. The method for the production of hydrogen as claimed in claim 1 wherein at least one product of at least one step is used as reactant in at least one other step, and wherein all products of at least one step are recycled in order to form an overall closed loop thermochemical Cu—Cl cycle reaction through intermediate copper and chlorine compounds.

3. The method for the production of hydrogen as claimed in claim 1 wherein copper having a particle size between 1 μm to 500 μm and dry hydrogen chloride (HCl) are preheated at 300-600° C.

4. The method for the production of hydrogen as claimed in claim 1 wherein the hydrogen generation reaction is carried out with a mole ratio of Cu to dry hydrogen chloride gas flow rate in the range between 1:1 to 1:10, and a mole ratio of dry hydrogen chloride gas to nitrogen in the range between 1:0 to 1:10.

5. The method for the production of hydrogen as claimed in claim 1 wherein the hydrogen generation reaction is carried out with a reaction temperature in the range between 300° C. to 600° C.

6. The method for the production of hydrogen as claimed in claim 1 wherein the electrolysis of CuCl is carried out in aqueous conditions.

7. The method for the production of hydrogen as claimed in claim 1 wherein the hydrolysis of $CuCl_2$ is carried out to obtain solid CuO and dry hydrogen chloride (HCl).

8. The method for the production of hydrogen as claimed in claim 1 wherein the reaction of CuO with chlorine is carried out to obtain molten CuCl salt and oxygen gas.

9. The method for the production of hydrogen as claimed in claim 1 wherein the hydrolysis of $CuCl_2$ is carried out with superheated steam.

10. The method for the production of hydrogen as claimed in claim 9, wherein the superheated steam has a temperature ranging from 200° C. to 600° C.

11. The method for the production of hydrogen as claimed in claim 9, wherein the superheated steam has a pressure ranging from 1 atm to 5 atm.

12. The method for the production of hydrogen as claimed in claim 1 wherein hydrolysis of $CuCl_2$ is carried out in the temperature range of 100° C. to 800° C.

13. The method for the production of hydrogen as claimed in claim 9 wherein the hydrolysis of $CuCl_2$ with superheated steam is carried out with a mole ratio in the range 1:1 to 1:100 of steam to copper chloride.

14. The method for the production of hydrogen as claimed in claim 9 wherein the hydrolysis of $CuCl_2$ with superheated steam is carried out at atmospheric pressure.

15. The method for the production of hydrogen as claimed in claim 1 wherein the reaction of CuO with chlorine is carried out at a temperature in the range of 300° C. to 700° C.

16. The method for the production of hydrogen as claimed in claim 1 wherein the reaction of CuO with chlorine is carried out with a mole ratio of copper oxide to chlorine between 1:1 to 1:10.

17. The method for the production of hydrogen as claimed in claim 1 wherein reaction of CuO with chlorine is carried out at atmospheric pressure.

18. The method for the production of hydrogen as claimed in claim 1 wherein the $CuCl_2$ is decomposed at a temperature in the range of 300° C. to 700° C. to produce molten CuCl salt and chlorine gas.

19. The method for the production of hydrogen as claimed in claim 18 wherein the $CuCl_2$ is decomposed in the temperature in range of 400° C. to 550° C.

20. The method for the production of hydrogen as claimed in claim 1 wherein the $CuCl_2$ that is partially decomposed is in the range of 10 to 90 percent, of the total $CuCl_2$ produced in step b).

21. The method for the production of hydrogen as claimed in claim 1 wherein the $CuCl_2$ obtained in step b) is dried or partially dried.

22. The method for the production of hydrogen as claimed in claim 1 wherein the CuO obtained in step c) has a particle size in the range from approximately 1 to 500 microns.

* * * * *

UNITED STATES PATENT AND TRADEMARK OFFICE
CERTIFICATE OF CORRECTION

PATENT NO.         : 8,968,697 B2                                Page 1 of 1
APPLICATION NO.    : 14/131285
DATED              : March 3, 2015
INVENTOR(S)        : Ganapati Dadasaheb Yadav et al.

It is certified that error appears in the above-identified patent and that said Letters Patent is hereby corrected as shown below:

On the Title page, first column, item (12), delete "Dadasaheb et al." and insert -- Yadav et al. --.

On the Title page, first column, item (75) Inventors: delete "Yadav Ganapati Dadasaheb, Mumbai (IN); Parhad Prakash Santoshrao, Mumbai (IN); Nirukhe Ashwini Bhagavan, Mumbai (IN); Parvatalu Damaraju, New Delhi (IN); Bhardwaj Anil, New Delhi (IN); Prabhu Bantwal Narayana, New Delhi (IN); Thomas Nuzhath Joeman, New Delhi (IN); Kale Dilip Madhusudan, New Delhi (IN)"

and insert -- Ganapati Dadasaheb Yadav, Mumbai (IN); Prakash Santoshrao Parhad, Mumbai (IN); Ashwini Bhagavan Nirukhe, Mumbai (IN); Parvatalu Damaraju, New Delhi (IN); Anil Bhardwaj, New Delhi (IN); Bantwal Narayana Prabhu, New Delhi (IN); Nuzhath Joeman Thomas, New Delhi (IN); Dilip Madhusudan Kale, New Delhi (IN) --.

In the Claims

Col. 14, line 56, claim 20, delete "percent," and insert -- percent --.

Signed and Sealed this
Fifteenth Day of September, 2015

Michelle K. Lee
*Director of the United States Patent and Trademark Office*